March 31, 1942. K. V. NESSELMANN 2,278,133
REFRIGERATING SYSTEM
Filed Feb. 26, 1938
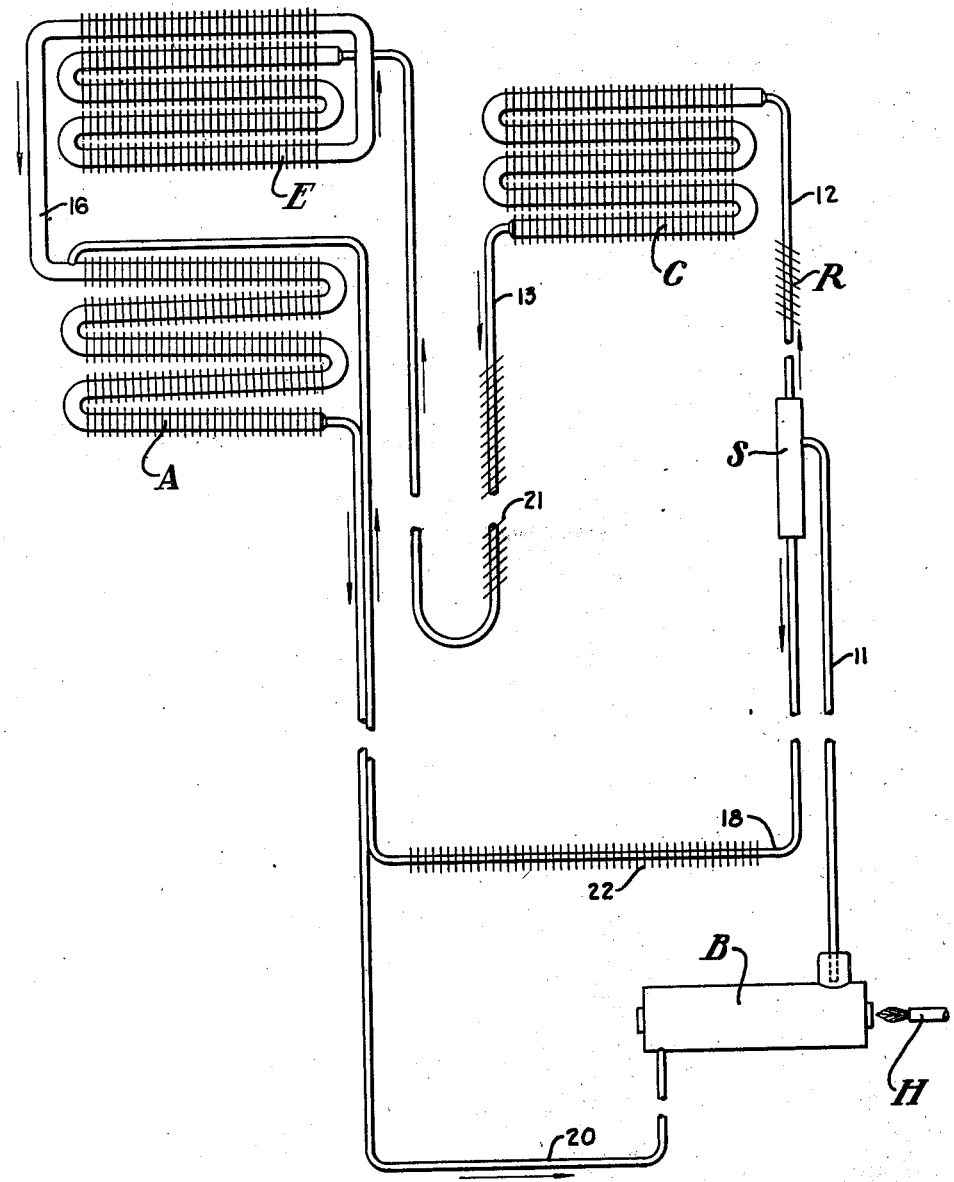
INVENTOR
Kurt V. Nesselmann
BY
Harry S. Dumarse
ATTORNEY Patented Mar. 31, 1942

2,278,133

UNITED STATES PATENT OFFICE 2,278,133

REFRIGERATING SYSTEM

Kurt V. Nesselmann, Berlin-Siemensstadt, Germany, assignor to The Hoover Company, North Canton, Ohio, a corporation of Ohio Application February 26, 1938, Serial No. 192,701
In Germany July 12, 1935

17 Claims. (Cl. 62—119)

This invention relates to refrigerating systems and more particularly to a specific type of system and certain fluids particularly adapted for use therein.

This application is a continuation in part of my co-pending application Serial No. 89,233 filed July 6, 1936, and relates back thereto for all common subject matter and the rights incident thereto.

Ammonia and water have commonly been used as the refrigerant and absorbent, respectively, in absorption refrigerating systems. These substances have the disadvantage that the ammonia water solution is lighter than water; therefore the absorption process tends to become blocked or static due to the fact that the surface of the absorbent becomes saturated with the ammonia and prevent further contact between the refrigerant vapor and lean absorption solution. Also, ammonia requires extremely high pressures if it is to be evaporated, condensed and re-evaporated to produce refrigeration at the temperatures ordinarily found desirable for normal uses of refrigeration. Both ammonia and water are slightly corrosive with respect to iron and eventually ammonia-water refrigerating systems accumulate appreciable quantities of scale which tends to fill the system and block further operation thereof. Ammonia will not readily dissolve in water except at high pressures and relatively low temperatures wherefor the absorption process is attended with considerable difficulty, and the difference in weight between the columns of strong solution entering the boiler and the column of weak solution leaving the boiler are so small that circulation cannot be promoted by such differences in weight. Furthermore, the extreme pressure variations required for an ammonia refrigerating system render it altogether unsuitable for use in the columnar type of system; that is a refrigerating system in which the pressure differentials in various parts thereof are balanced or maintained by columns of liquid. The light weight of ammonia is a particular disadvantage here by reason of the fact that high columns of ammonia are required in order to create relatively small static pressures.

Accordingly, it is an object of the present invention to provide a refrigerating system and a group of cooperating substances for use in such system which will overcome the disadvantages above noted.

A particular object of the present invention is to provide a binary fluid in which the absorbent has a smaller molecular weight and also a smaller specific weight, in its liquid phase, than the molecular weight and specific weight of the working medium or refrigerant.

If the molecular weight of the absorbent is less than the molecular weight of the fluid to be absorbed, a desirable condition is brought about in the absorber because a higher concentration is obtained for a given temperature than would be the case by other relationships of molecular weight. If the molecular weight of the working medium or refrigerant is large compared to that of the absorbent, it is also true that the conditions are such that the liquid phases of both the refrigerant and the absorbent diffuse into one another more rapidly than would otherwise be the case.

Also if the specific weight of the absorbent in liquid form is smaller than that of the fluid absorbed then the solution formed in the absorber immediately sinks to the bottom of the absorber and the weaker solution flows to the top. This is just the opposite to the action where water absorbs ammonia and materially aids in the speed of the absorption because the more active absorbent rises and makes better contact with the gas being absorbed. Moreover it permits the same concentration to be reached at a higher temperature than would otherwise be the case.

It is still another object of the invention to provide a binary fluid which does not attack metal and which does not decompose. This is particularly of interest in connection with columnar machines, the fluids previously suggested, as for example those mentioned in Altenkirch Patent 1,728,742 having the disadvantage that corrosion or decomposition is likely to result if the apparatus is built of metal such as steel tubing.

It is still another object of the invention to provide a binary fluid in which the molecular weight is such that the fluids have small internal friction. In general absorbents which have low molecular weight also have low internal friction and accordingly the absorbents of the present invention have been selected to gain this advantage.

According to the invention there is provided a refrigerating system in which substantial pressure differences are maintained in different parts thereof solely by columns of liquid, in which the absorption process is very efficient by reason of the fact that a strong solution of the refrigerant in the absorbent is heavier than the weak solution of similar character wherefore weak solution will float on top of the strong solution to be presented to vapors to be absorbed, in which the refrigerant is very readily absorbed by the absorbent without undue dissipation of heat, in which the refrigerant will undergo the necessary changes in phase at relatively low pressure at the desired temperatures, in which the relative densities of the refrigerant and the absorbent are such as to promote efficient circulation of fluids in the system, and in which the vapor pressures of the refrigerant and absorbent under any given conditions are so widely diverged as to substantially minimize or eliminate vaporization of absorption solution in the boiler or generator.

Other objects and advantages of the invention will become apparent as the description proceeds, when taken in connection with the accompanying drawing, in which:

There is represented diagrammatically one form of refrigerating system embodying the invention.

The refrigerating mechanism illustrated in the accompanying drawing represents but one type of system in which the invention may be incorporated. Various and sundry other systems could be utilized to practice the invention. As illustrated the refrigerating system comprises a boiler B, a vapor separation chamber S, a rectifier R, a tubular air-cooled condenser C, an evaporator E, and a tubular air-cooled absorber A. The boiler B is heated by a suitable source of heat such as an electrical cartridge heater, fluid fuel burner, or a gas burner such as that diagrammatically illustrated at H. The elements just described are suitably interconnected by various conduits to form a complete refrigerating system.

A vapor lift conduit 11 of well known type connects the boiler B with the separation chamber S. A vapor conduit 12, which includes the rectifier R, connects the upper portion of vapor separation chamber S to the upper portion of the air-cooled condenser C. As shown, the condenser C is indicated as being in a vertical position; however, it is to be understood that the condenser may be in other positions and that other types may be utilized if desired. A long U-shaped liquid refrigerant conduit 13 connects the lower portion of the condenser C to the upper portion of the evaporator E. The evaporator E is illustrated as comprising a series of reversely bent conduits which are serially connected to form a continuous vapor and liquid conduit. The bottom portion of the evaporator is indicated as turning upwardly to form a top conduit above the main body portion of the evaporator. This is done in order that the cold refrigerant vapors discharging from the evaporator may pass through the upper conduit which will then function as a space cooling conduit whereas the lower portion of the evaporator may function as an ice freezing or congealing mechanism. The end portion of the evaporator space or box cooling section is connected to the upper portion of the tubular air-cooled absorber A by a vapor conduit 16. The absorber A is illustrated as lying in a vertical plane; however, it is to be understood that this absorber may be of any desired form or construction and that it may lie in any plane from the vertical to a plane slightly inclined from the horizontal.

The separation chamber S is connected to the absorber A adjacent the connection of the absorber A and the vapor conduit 16 by a U-shaped weak solution conduit 18. The bottom portion of the absorber is connected through a U-shaped conduit 20 to the boiler B. As indicated, the fluids passing through the conduits 18 and 20 may be brought into heat exchange relationship.

The conduits 13 and 18 may be provided with air cooling fins 21 and 22 respectively, if desired. The fins 21 and 22 normally will improve the efficiency of the system by pre-cooling the refrigerant liquid and the weak absorption solution.

In the operation of the refrigerating system just defined, refrigerant vapor is generated in the boiler by vaporization from the refrigerant absorbent solution therein contained. The refrigerant vapor so generated travels upwardly through the vapor lift conduit 11 and elevates weak solution through said conduit in the well known manner. The refrigerant vapor and the absorption solution separate in the separation chamber S and the vapor passes upwardly through the conduit 12. The rectifier R serves to condense any vapor of absorption solution which may pass into the conduit 12. The refrigerant vapor is liquefied in the condenser C and passes therefrom through the conduit 13 into the evaporator E.

The weak solution delivered to the separation chamber is conveyed therefrom into the upper portion of the absorber A through the U-shaped conduit 18 and the strong solution formed in the absorber is conveyed therefrom into the boiler B through the U-shaped conduit 20. The refrigerant liquid discharged into the evaporator evaporates therein to produce refrigeration and the cold vapor passes through the upper coil of the evaporator to serve as a space cooling means. The refrigerant vapor is then conveyed into the absorber A in which it is brought into intimate contact with absorption solution and is absorbed thereby.

The pressure maintained in the boiler B, separation chamber S, and condenser C, are higher than those prevailing within the absorber A and the evaporator E. This result is achieved without the provision of any moving parts, valves, or other similar devices within the system. The column of liquid standing in the U-shaped conduit 13 maintains an appreciably higher pressure in the condenser than that prevailing in the evaporator and as a result thereof, the liquid column in the leg of the conduit 13 which discharges into the evaporator E is materially higher than the liquid column maintained in the said conduit on the condenser leg thereof. By this means, the pressure prevailing within the evaporator is maintained at a value materially lower than that prevailing within the condenser C and the boiler B. In like manner, the absorber A is maintained at a pressure materially lower than that prevailing in the boiler B and separation chamber S by liquid columns in the conduits 20 and 18, respectively. The liquid columns in the legs of the conduits 20 and 18 which connect directly to the absorber are materially higher than the columns maintained in the legs of said conduit which connect directly to the boiler and separation chamber, respectively. Therefore, it will be seen that liquid refrigerant is vaporized from solution in the boiler at high pressure and is condensed in the condenser C at high pressure whereas the liquid is evaporated in the evaporator E and absorbed in the absorber A at low pressure and that these pressure differentials are maintained simply by providing liquid columns which separate the boiler-condenser system from the evaporator-absorber system.

The operation of the above described refrigerating system will be elaborated upon later in connection with particular substances found to be highly desirable for use therein and now to be described.

In accordance with the present invention it is proposed to use organic material for both the working medium or refrigerant and the absorbent for the working medium.

This invention is particularly concerned with the relationship existing between the molecular and specific weights in the liquid state of the absorbent and the refrigerant. According to the invention, the molecular and specific weights in the liquid state of the refrigerant are materially higher than the molecular weights and specific weights in the liquid state of the absorbent. It is particularly desirable, though not necessary according to the invention, to provide a refrigerant and an absorbent in which the ratios of the molecular and specific weights of the refrigerant with respect to the molecular and specific weights of the absorbent are in the neighborhood of 2 to 1. By providing refrigerants and absorbents in which the molecular weight of the refrigerant is higher than the molecular weight of the absorbent a very desirable condition is brought about in the absorber because a very high concentration of refrigerant in the absorbent may be obtained for any given temperature condition. The heat of absorption may be rejected at high temperatures which produces an efficient operation of the apparatus, efficiently utilizes the absorber, and permits a relatively small absorber having a relatively small heat rejecting area to be utilized. Furthermore, under the conditions above noted, the refrigerant and the absorbent diffuse one into another very readily.

By selecting a refrigerant having a specific weight in the liquid state materially greater than the specific weight in the liquid state of the absorbent, a very desirable condition is brought about in that the refrigerant absorbent solution formed in the absorber immediately sinks to the bottom of the liquid therein contained, thereby presenting to the refrigerant vapor the weakest absorption solution in the absorber. As a result of this action a high concentration and a high rate of absorption are promoted because of the fact that weak solution is always presented to the refrigerant vapor, and saturated solution is immediately removed from the zone of absorption whereby it is unable to interfere with the continuing absorption process. Moreover, this phenomena permits the same solution concentration to be reached and at higher temperatures than would otherwise be the case.

Refrigerants and absorbent having the particular relationships disclosed herein are adapted for use in any type of absorber; but the tubular absorber illustrated is a preferred type. The absorber may be constructed to permit the absorbent to flow therethrough in a continuous stream in which event the heavy saturated solution will form the substratum of the liquid stream. An absorber constructed to form absorption liquid pools and to drain the liquid at the bottom portions of the pools to the absorber outlet is also desirable.

The binary mixture comprising the refrigerant and the absorbent may include refrigerants such as ethylene bromide $BrCH_2CH_2Br$—molecular weight 188, specific weight 2.17—or ethyl iodide $C_2H_5I$—molecular weight 156, specific weight 1.93—, and absorbents such as an alcohol. Amyl alcohol $CH_3(CH_2)_3CH_2OH$—molecular weight 88, specific weight .817—, butyl alcohol $C_4H_9OH$—molecular weight 74, specific weight .81—, and benzyl alcohol $C_6H_5CH_2OH$—molecular weight 108, specific weight 1.04— are particularly advantageous absorbents. These substances have been found to be particularly desirable and to possess the desired relationship between the molecular and specific weights of the refrigerant and the absorbent to a high degree; however, other substances may be used, provided of course, that the necessary relationship between the molecular and specific weights of the absorbent and refrigerant are found.

The freezing point of the refrigerant used in the binary fluids depends, of course, upon the selection of the fluids used. Where a refrigerating system does not require the maintenance of a very low temperature, as for example, in room cooling, ethylene bromide is particularly suitable as a refrigerant. Ethylene bromide ordinarily freezes at a temperature above 0° centigrade; however, if a lower temperature is to be obtained, some other substance may be added to the binary mixture. One such substance which may be added to a binary mixture including ethylene bromide is xylol—$C_6H_4(CH_3)_2$. It has been found that particularly desirable mixtures are obtained where ethylene bromide was used as a refrigerant and an alcohol as a solvent, if xylol is added to the ethylene bromide in the proportion of about one part xylol to four parts ethylene bromide, by weight. In this way, the freezing point may be lowered to approximately −8° centigrade. With these fluids, crystals begin to form in the refrigerant at a temperature of approximately −8° centigrade; however, at certain temperatures the pressure of the ethylene bromide is higher than that of the xylol so that during vaporization of the refrigerant in the evaporator, the ethylene bromide is transferred to the absorber, wherefor the remaining mixture in the evaporator is rich as to the xylol content and the freezing point of the mixture may be lowered still further. It has also been found that the binary mixture of ethylene bromide and alcohol forms readily even though the temperature of the absorbent is relatively high. From a thermo-dynamic standpoint this is very desirable since a solution may be formed at a high temperature in the absorber and heat readily discharged therefrom. The efficiency of the system using these fluids is thus very high.

Ethyl iodide is a particularly advantageous refrigerant for use in low temperature refrigerating systems, such for example, as an ice-freezing system. Thus the freezing point of ethyl iodide is below −100° centigrade, and the vapor pressure of ethyl iodide is approximately 25 mm. of mercury at a temperature of 10° below zero centigrade. Therefore, it is clear that ethyl iodide forms an excellent refrigerant for low temperature installation. The temperature vapor pressure characteristics of ethyl iodide are such that ordinarily there would be no necessity for adding a substance thereto to lower its freezing point in order to produce refrigeration at lower temperatures, though such procedure could be followed if desired. Generally, it will be preferable to select a refrigerant having an appreciable vapor pressure at the temperatures desired, rather than to add a third fluid such as xylol in order to reduce the melting point of the refrigerant.

Any of the absorbents mentioned, or others having similar properties, and presenting the proper relationship between the molecular and specific weights thereof, may be utilized with the refrigerant. However, it is generally desirable to select an absorbent for each refrigerant which has a melting point sufficiently low to prevent freezing of the absorbent in the evaporator at any temperatures likely to be encountered in an actual refrigerating system. For these reasons, butyl-alcohol or amyl-alcohol are particularly desirable combinations for use with ethyl iodide because of their extremely low freezing points, whereas benzyl alcohol may advantageously be utilized with ethylene bromide because of the fact that the freezing point of benzyl alcohol is substantially lower than the freezing point of ethylene bromide, either alone or in combination with xylol. Also, it is desirable to select an absorbent which has a very small vapor pressure relative to the vapor pressure of the refrigerant at temperatures likely to be encountered in the generator of the refrigerating system. For example, the vapor pressure of benzyl alcohol is very low with respect to the vapor pressure of either ethyl iodide or ethylene bromide at nearly all temperature ranges and this difference in vapor pressures is particularly marked within the range of temperatures likely to be encountered in refrigerating systems.

Referring now to the refrigerating system particularly disclosed herein, it will be appreciated that the pressure balancing column in the conduit 13 connecting the condenser and the evaporator may be relatively shallow due to the relatively great weight of the refrigerant liquid therein contained and its resulting ability to balance appreciable pressures for each increment of length of liquid column. The solution columns in the conduits 20 and 18 which counterbalance or maintain the boiler pressure must be longer than the liquid column maintained in the conduit 13 by reason of the smaller specific weight of the absorbent which forms the principle component of the solution contained in the columns 18 and 20. However, there is not a disadvantage, as in ordinary practice it is desirable to position the condenser, absorber, and evaporator at relatively high levels and to position the boiler at a relatively low level, and therefore the columns which must be interposed between the absorber and the boiler offer no obstacle to the designer. The pressure balancing column maintained in the conduit 18 must be greater than that maintained in the conduit 20 because of the greater specific weight of the strong solution contained in the column 20, but again this does not offer a serious disadvantage for the reason that the column 18 must extend to the top portion of the absorber at all events in order that the absorption solution may flow downwardly through the absorber by gravity. Also, the difference in density between the heavy strong solution in the conduit 20 and the light weak solution in the conduit 18 promotes circulation of the solution in the boiler-absorber circuit. Therefore, it will be seen that the refrigerating system diagrammatically illustrated in the accompanying drawing, accurately depicts the relative relationship of the parts of the system necessary to the proper realization of the invention herein disclosed.

The refrigerating system herein disclosed and the substances disclosed for use therein provide a particularly advantageous arrangement in that relatively short balancing liquid columns may be utilized to maintain the necessary pressures in the system. The substances recommended for use may be vaporized in the boiler at relatively low temperatures and pressures as compared with ammonia, thereby permitting the apparatus to be brought within reasonable height limitations, the absorption process is very efficient because of the fact that the strong solution immediately removes itself from the zone of absorption and displaces into such zones the weak solution, and the absorption process itself proceeds to completion under the most efficient conditions.

While I have illustrated and described but a few embodiments of my invention, it is to be understood that it is not limited thereto and that it may be embodied in other constructional forms and that other substances may be used as refrigerant and absorbent without departing from the spirit of the invention and the scope of the appended claims.

I claim:

1. In an absorption system a pair of fluids comprising ethylene-bromide and benzyl-alcohol.

2. In an absorption system a pair of fluids comprising ethylene-bromide and benzyl-alcohol together with a third fluid adapted to lower the freezing point of one of said pair.

3. In an absorption system, a working medium consisting of ethylene-bromide, an absorbent for the working medium consisting of benzyl-alcohol and a substance to reduce the temperature at which the working medium freezes.

4. In an absorption system, a working medium consisting of ethylene-bromide, an absorbent for the working medium consisting of benzyl-alcohol and a substance to reduce the temperature at which the working medium freezes, said substance being xylol.

5. In an absorption system, a working medium consisting of ethylene-bromide, an absorbent for the working medium consisting of benzyl-alcohol and a substance to reduce the temperature at which the working medium freezes, said substance being xylol and being mixed with the working medium in a proportion of approximately one part xylol to four parts ethylene-bromide, by weight.

6. In an absorption system a pair of fluids comprising ethyl iodide and an alcohol solvent therefor having a lower specific gravity in liquid form than said iodide.

7. A group of substances for use in a refrigerating system comprising ethyl iodide and butyl-alcohol.

8. A group of substances for use in a refrigerating system comprising ethyl iodide and amyl-alcohol.

9. A group of cooperating substances for use in a refrigerating system comprising amyl alcohol and a refrigerant absorbable therein having a greater molecular and specific weight.

10. A group of cooperating substances for use in a refrigerating system comprising butyl alcohol and a refrigerant absorbable therein having a greater molecular and specific weight.

11. That improvement in the art of refrigeration which includes the steps of applying heat to a solution of ethylene bromide and benzyl alcohol to expel ethylene bromide vapor therefrom abstracting heat from the ethylene bromide vapor to liquefy the same while maintaining the liquefying vapor under the pressure of a pressure balancing head of liquefied ethylene bromide, evaporating the liquefied ethylene bromide at a lower pressure to produce useful cooling, absorbing the ethylene bromide vapor at the evaporating pressure in solution previously weakened by the expulsion of ethylene bromide therefrom, and maintaining the heated solution under the pressure of pressure balancing heads of strong and weak solution of ethylene bromide and benzyl alcohol.

12. That improvement in the art of refrigeration which includes the steps of applying heat to a solution of ethylene bromide and benzyl alcohol to expel ethylene bromide vapor therefrom, abstracting heat from the ethylene bromide vapor to liquefy the same while maintaining the liquefying vapor under the pressure of a pressure balancing head of liquefied ethylene bromide, evaporating the liquefied ethylene bromide at a lower pressure to produce useful cooling, absorbing the ethylene bromide vapor at the evaporating pressure in solution previously weakened by the expulsion of ethylene bromide therefrom, maintaining the heated solution under the pressure of pressure balancing heads of strong and weak solution of ethylene bromide and benzyl alcohol, and circulating the solution by the density differential between the strong and weak solution.

13. In an absorption system, two fluids consisting of a working medium and an absorbent therefor, the fluids being characterized by the fact that the absorbent has a lower molecular weight than the working medium and also by the fact that in their liquid states, the absorbent has a lower specific weight than the working medium.

14. In an absorption system, a pair of fluids consisting of a working medium consisting of an organic substance and an absorbent for the working medium, said absorbent consisting of an alcohol and having a lower molecular weight and a lower specific weight in liquid form than the working medium.

15. That improvement in the art of refrigeration which includes the steps of expelling refrigerant vapor from a solution of refrigerant and absorbent in which the molecular weight of the refrigerant exceeds the molecular weight of the absorbent and in which the specific weight of the refrigerant in liquid form exceeds the specific weight of the absorbent in liquid form, liquefying the refrigerant vapor, evaporating the liquid refrigerant to produce refrigeration, and absorbing the refrigerant vapor in the weak solution resulting from the expulsion of refrigerant vapor, while maintaining a high pressure on the solution from which vapor is being expelled and the liquefying vapor by pressure balancing columns of liquid.

16. That method of producing refrigeration which includes the steps of expelling refrigerant vapor in a generating zone from solution in an absorbent, in which the molecular weight of the absorbent in liquid form is lower than that of the refrigerant in liquid form, liquefying the vapor, evaporating the liquid refrigerant to produce refrigeration, contacting the resulting vapor with weak solution formed by the expulsion of refrigerant vapor in the generating zone in an absorbing zone, returning the strong solution formed in the absorbing zone to the generating zone, providing pressure balancing columns of strong and weak solution to maintain a higher pressure in the generating zone than in the absorbing zone, forming a pressure balancing column of liquid to maintain a pressure differential between the liquefying and evaporating bodies of refrigerant, and promoting solution circulation through the absorbing and generating zones by the difference in density between the strong solution entering the generating zone and the weak solution leaving the generating zone.

17. In combination, a refrigerating apparatus comprising a generator, a condenser, an evaporator, an absorber, a weak solution conduit connecting said generator and absorber, a strong solution conduit connecting said absorber and generator, a refrigerant vapor conduit connecting said generator and condenser, a refrigerant vapor conduit connecting said evaporator and absorber, and a liquid refrigerant conduit connecting said condenser and evaporator, said apparatus being charged with a refrigerant and an absorbent for said refrigerant having a lower molecular weight and a lower specific weight in liquid form than said refrigerant, said strong and weak solution conduits being so related to said generator and absorber as to provide pressure balancing columns of strong and weak solution between said generator and absorber to maintain a higher pressure in said generator than in said absorber and said liquid refrigerant conduit being so related to said condenser and evaporator as to provide a pressure balancing column of liquid between said evaporator and condenser to maintain a higher pressure in said condenser than in said evaporator.

KURT V. NESSELMANN.